Sept. 4, 1973          M. WILLIAMS          3,756,783
AUTOMATIC CLINICAL CHEMISTRY ANALYZER
Filed Aug. 23, 1971          3 Sheets-Sheet 1

SAMPLE    REAGENT    REACTION

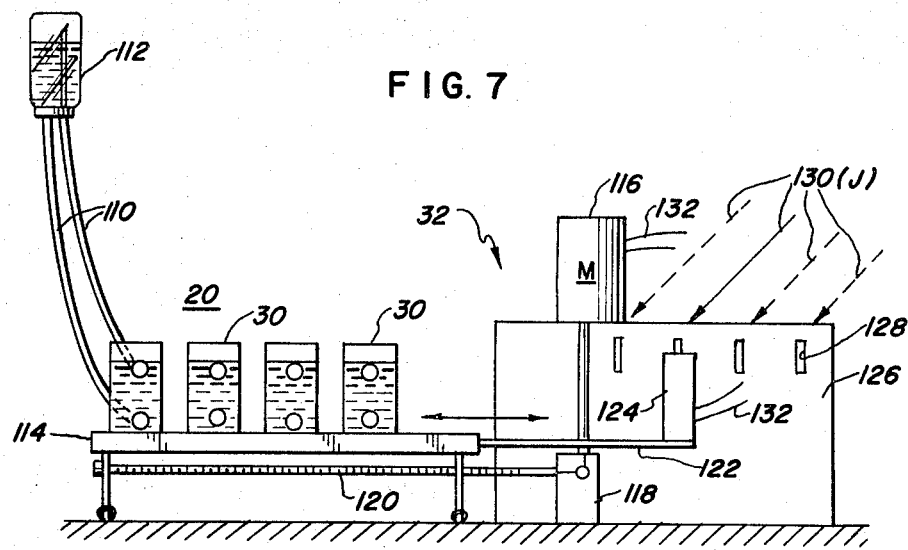
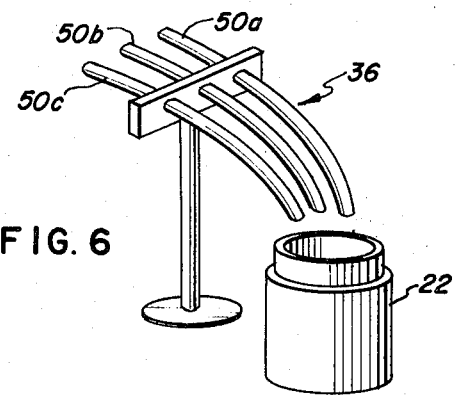
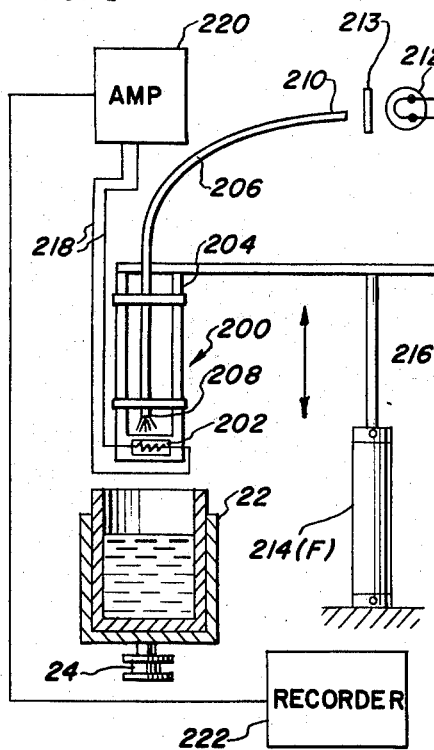
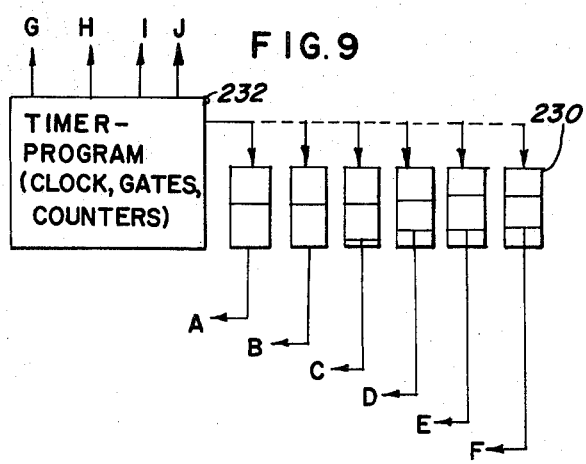

United States Patent Office 3,756,783
Patented Sept. 4, 1973

3,756,783
AUTOMATIC CLINICAL CHEMISTRY ANALYZER
Melvin Williams, 840 Elmwood, Evanston, Ill. 60202
Filed Aug. 23, 1971, Ser. No. 173,855
Int. Cl. G01n 1/00, 33/16
U.S. Cl. 23—253 R                   3 Claims

ABSTRACT OF THE DISCLOSURE

Apparatus for automatically sequentially performing chemical analyses of a plurality of the same or different types of discrete samples utilizing any one or more of a number of reagents, including a unique reagent selection device useful in multi-specimen testing systems, wherein any one of a number of reagents can be selected for mixing with a particular fluid specimen. An improved probe photometer for measuring the emission characteristics of the specimen under test.

---

This invention relates to automated chemical analyzers, and more particularly to apparatus for automatically conducting clinical chemical analyses of liquid specimens.

BACKGROUND OF THE INVENTION

Various types of mechanical, automated apparatus have been proposed for conducting chemical analyses of fluids, such as specimens of blood, urine, etc. in accordance with standard clinical analysis procedures. Examples of such apparatus may be found in Baruch U.S. Pat. No. 3,193,-358; Baruch et al. U.S. 3,193,359; Lukrec U.S. 3,269,-800; and Vaills U.S. 3,544,272. The overriding problem with such suggested prior devices is that they contain a multiplicity of components which make the entire system not only expensive to construct, but also to maintain and repair. In particular, some of such proposed systems utilize a moveable valve and multi-chambered pump arrangement for selecting either the specimen or a reagent for pumping to the respective pump chamber and thereafter through the pumps to a container for processing. Not only are such valve and pump arrangements expensive, but there are also attendant problems in the troublesome nature of such devices in terms of breakdown and maintenance. In addition, since the same expensive equipment—that is the fluid lines, valve, chambers, and pumps are being used for bringing together various fluid specimens and reagents, to eliminate any problem of contamination, the system requires intermittent cleaning of the equipment. This significantly lowers the number of tests which can be conducted by the system. In Lukrec pipetting elements are immersed first into a specimen sample for transferring the sample to a reaction container, and subsequently into a reagent container for transferring the reagent to the reaction container. In that system, the various samples and reagent containers are supported on a moveable frame and drive means are provided for moving the entire frame of sample and reagent containers below the respective pipetting elements. Such a system is not only time consuming in the time necessary for moving the entire sample and reagent frame, but is also restricted in the number of samples which can be tested, since any frame for holding a small number of specimens would quickly become impractical for utilization where any number of specimens as commonly encountered in present clinical analyses would be required. In the Vaills patent only a successive dilution machine is illustrated, employing a number of syringes under individual spring control for aspirating a measured amount of serum. While such apparatus may be acceptable for successive dilution type systems, the change in spring tension with age and resulting changes in the amount of fluid aspirated makes such apparatus unacceptable for rate or colorimetric reaction analysis.

SUMMARY OF THE INVENTION

Therefore, in accordance with the principles of the present invention, there is provided apparatus for automatically sequentially performing chemical analyses of a plurality of the same or different types of discrete samples utilizing any one or more of a number of reagents and including novel means for aspirating and displacing reagent and serum without employing prior troublesome multi-chambered pump and valve arrangements. Furthermore, the novel system includes a unique reagent selection device useful in multi-specimen testing systems, wherein any one of a number of reagents can be selected for mixing with a particular fluid specimen.

In still another aspect of the invention, an improved probe photometer is provided for measuring the emission characteristics of the specimen under test.

BRIEF DESCRIPTION OF THE DRAWINGS

FIG. 6 illustrates one of the reagent displacement stations provided along the reaction cuvette conveyor path for inserting a particular reagent associated with a respective displacement pump for said station;

FIG. 7 is an elevational view illustrating a novel reagent selector at the initial transfer position for selectively positioning any one of the illustrated four reagents at said transfer position for mixing with a desired sample;

FIG. 8 is an elevational view, partly in section and partly schematic, illustrating an improved probe photometer for measuring and recording the emission characteristics of the sample such as optical density and absorbence; and FIG. 9 is a block diagram schematically illustrating the preset sequential timing and control apparatus which selectively operates the apparatus herein illustrated.

DETAILED DESCRIPTION

Figure 1:
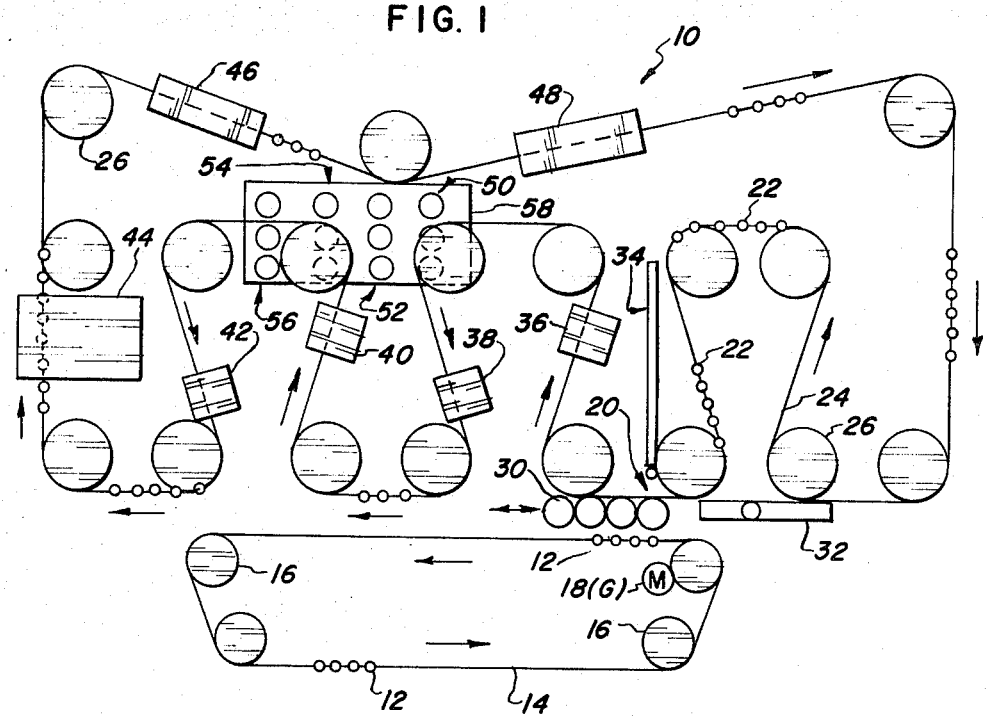
FIG. 1 is a schematic plan view of the apparatus for automatically performing chemical analyses in accordance with the present invention.

Referring now to FIG. 1, there is schematically illustrated a plan view of the automatic clinical analyzer 10 in accordance with the present invention. FIGS. 2–8 illustrate the various components and schematic operations performed by this system. FIG. 9 illustrates a block diagram showing the "programmed" preset control arrangement for sequentially timing the various functions performed during operation of the system as will be described in more detail hereinafter.

In FIG. 1, there is illustrated a plurality of sample containers 12 for containing discrete specimens, supported by a drive chain 14 for movement around the four sprocket wheels 16. At least one of the sprocket wheels 16 is coupled to a stepping motor 18 for sequentially moving the sample containers 12 adjacent and through an initial transfer position 20.

A second closed loop arrangement is provided for sequentially moving a series of reaction cuvettes or containers 22 on an endless chain 24 similar to the chain 14. It must be understood that only a few sample containers 12 and reaction containers 22 have been illustrated along respective chains 14 and 24 for illustration, although of course a complete series of containers is provided along the respective chains. At least two of the sprockets 26 operatively engaging the chain 24 are rotatingly driven by a stepping motor 28 (see FIG. 2) for sequentially moving each of the reaction containers 22 adjacent and through the initial transfer position 20 and around the closed loop during operation of the system.

A series of reagent containers 30 each containing the same or a different reagent for combining with a particular specimen in the sample containers 12 is mounted at the transfer position 20 intermediate the sample containers 12 and reaction containers 22. Positioning apparatus 32 (see FIG. 7) is provided for selectively positioning a respective reagent container 30 at the transfer position 20 for combining the desired reagent with a particular specimen. An indexing arm assembly 34 is suitably mounted for selecting a measured quantity of reagent from containers 30 and specimen from containers 12 for depositing the combination in reaction containers 22 at the transfer position 20.

While the structural and operating details of the present invention will be described more particularly hereinafter, it might be pointed out now that from the initial transfer position 20, the reaction containers 22 are sequentially stepped around the closed loop for transportation to a series of reagent dispensing stations 36, 38, 40, 42, through the measuring station 44, and reaction container washing and drying stations 46, 48, respectively. A set of reagent dispensers 50, 52, 54 and 56 are mounted on the frame 58. The reagent dispensers 50 are associated with reagent dispensing station 36; the reagent dispensers 52 are associated with reagent dispensing station 38; etc.

Since the reaction containers 22 are driven in a sequential timed movement around the closed loop, the lapsed time for the reaction container 22 to be moved from the initial transfer position 20 to the first reagent dispensing station 36 and between the remaining reagent dispensing stations is a fixed interval. If desired, therefore, any one of the three reagents in containers 50 can be selected for dispensing through respective dispensing lines 50a, b, c located at station 36 to a reaction container 22 at the station, as illustrated in FIG. 6. Similarly, the set of reagent dispensers 52 is provided for selectively inserting a respective reagent at station 38; reagent dispensers 54 are associated with reagent dispensing station 40; and dispensers 56 are associated with station 42. Therefore, it can be seen that the reagent dispensing stations are located at timed intervals from the initial transfer position in order that if desired, additional reagent can be dispensed to the reaction container as it is moved around the closed loop adjacent the particular dispensing station.

Following the reagent dispensing station 42. the reaction containers 22 are conveyed by chain conveyor 24 to measuring station 44 which contains a spectrophotometer for providing measurements such as colorimetric measurements on the fluid contained in the reaction container. Such a measurement technique is well known. However, in accordance with another aspect of the present invention, there is provided an improved probe photometer unit illustrated in more detail in FIG. 8.

Figure 2:
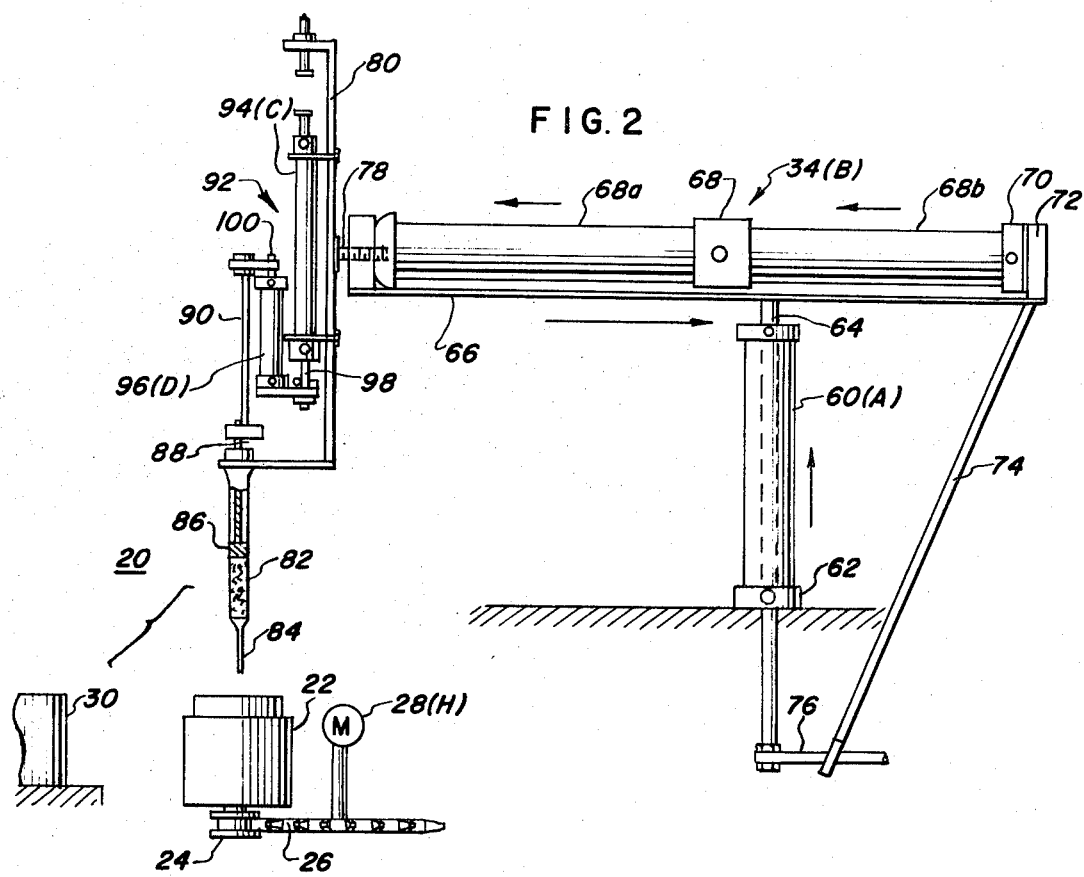
FIG. 2 is an elevational view of an indexing arm assembly which provides a mixture of the required reagent and serum.
Figure 3:
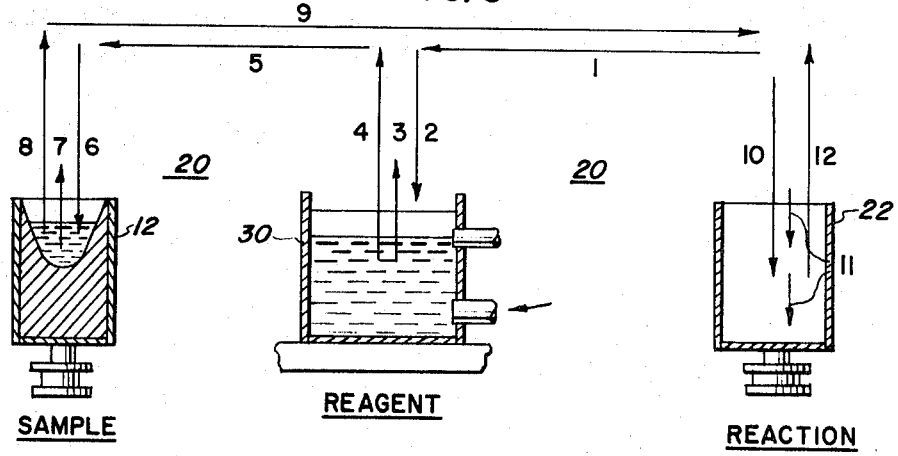
FIG. 3 is a schematic illustration of the sequential steps involved in the movement of the indexing arm assembly of FIG. 2 at the initial transfer position to provide a mixture of reagent and sample in the reaction cuvette or container.

Referring now to FIGS. 1, 2 and 3 there is illustrated the apparatus for combining a predetermined amount of reagent and sample for placement in the reaction containers 22. As shown in FIG. 1, at the transfer position 20, one of the sample containers 12, reagent containers 30 and reaction containers 22 are aligned with the indexing arm 34. The construction details of the indexing arm are shown in FIG. 2 and its sequential step operation in the transfer of sample and reagent to the reaction container are illustrated in FIG. 3.

In particular, the indexing arm assembly 34 includes vertical positioning means such as pneumatic cylinder 60 having a fixed end 62 and an operating piston 64 mounted to bracket 66 for selective vertical movement of the bracket 66. Mounted on bracket 66 there is provided a double acting pneumatic cylinder 68 having a first operating section 68a and a second operating section 68b. The end 70 of pneumatic cylinder 68 is affixed to one end 72 of bracket 66, and an angle brace 74 is also connected to the end of 72. The other end of angle brace 74 slidably engages a support rod 76 for preventing horizontal displacement of the fixed end 70 of cylinder 68 while permitting guided vertical movement of the cylinder 68 during driven movement by cylinder 60. The operating piston 78 of cylinder 68 is connected to bracket 80.

Also mounted to bracket 80 is a syringe 82 with a probe end 84, including a piston element 86 for aspirating fluid into the syringe body and for displacement therefrom. A rod 88 attached to piston 86 extends from the syringe 82 and is rigidly attached by suitable means to coupling rod 90. Pneumatic means 92 including a reagent pneumatic cylinder 94 is mounted to bracket 80 and to the coupling rod 90 for selective movement of piston 86 within the syringe 82. It must be noted that the piston 98 of reagent pneumatic cylinder 94 is connected to one end of sample pneumatic cylinder 96, whereas the piston 100 of cylinder 96 is connected to the rod 90 for direct movement of the syringe piston element 86. Thus, the piston 98 is directly coupled to the syringe piston element 86.

FIG. 3 illustrates the operation of indexing arm assembly 34 at the initial transfer position 20. The numbers adjacent the arrows in FIG. 3 denote the sequential operating steps of the indexing arm assembly. For instance, initially (1) either cylinder section 68a or 68b is operated to displace syringe 82 over reagent container 30; then (2) vertical cylinder 60 is operated to immerse probe 84 within the reagent container 30; (3) reagent pneumatic cylinder 94 is operated to directly move syringe piston 86 to aspirate a measured quantity of reagent into the syringe; (4) vertical cylinder 60 is again operated to move the probe 84 upwardly from reagent container 30; etc. The remaining sequence of operations are clearly shown in FIG. 3. In particular, on placement of the probe 84 into reaction container 22, both cylinders 94 and 96 are operated to displace first the sample and then the reagent therein, since first reagent and then sample is aspirated into the syringe. This enables the reagent to flush out the sample from the syringe 82 so that it can be utilized with a minimum possibility of any disturbing contamination in subsequent operations.

Referring now to FIG. 7, the reagent positioning means 32 are illustrated for positioning one of the containers 30 containing a particular reagent to the initial transfer position 20. Each one of the reagent containers 30 is connected through flexible supply lines 110 to a source 112 of the respective reagent. Each of the reagent containers 30 is maintained filled by gravity feed from the sources 112. As illustrated in FIG. 7 the reagent containers 30 are mounted on a moving platform 114. The platform 114 is driven by a motor 116 through gear box 118 and a worm gear 120. One end of the platform 114 is connected through bracket 122 to a photocell 124, the photocell being movable immediately adjacent a side wall 126. The side wall 126 includes a series of spacially separated apertures 128, one for each of the reagent containers 30.

As is schematically illustrated in FIG. 7, respective light beams 130, provided by suitable respective light sources, are individually selectable for directing the associated light beam through one of the apertures 128. As shown in FIG. 7, only one of the light beams 130 is present (the non-presence of the other light beams being shown in dotted lines). Photocell 124 adjacent the associated aperture 128 detects this light beam and through leads 132 connected to motor 116 maintains the platform 114 in position so that the associated reagent container 30 is located at the initial transfer position 20. If a different type of reagent which is contained in one of the remaining containers on platform 114 is desired for combining with the sample, movement of the associated reagent container to the initial transfer position is accomplished by turning off the particular light source associated with the light beam 130 then being detected by photocell 124. When the light beam goes off, photocell detects this condition and through leads 132 operates the motor 116 to drive platform 114 to seek another beam through one of the other apertures. This moves the photocell 124 adjacent another aperture 128 on wall 126, and if the particular associated light source is energized, the associated light beam 130 will be detected at photocell 124 and the motor de-energized. Thus, the desired associated reagent container 30 will have been moved to the initial transfer position 20.

Figure 4:
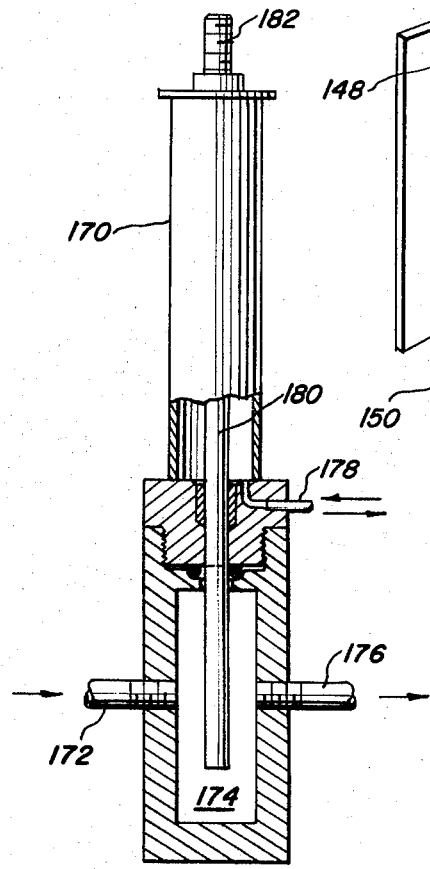
FIG. 4 is an elevational view, partly in section, illustrating one of a number of displacement dispensing pumps for inserting any one of threee different reagents at any one of the four reagent dispensing stations provided along the reaction container conveyor path.
Figure 5:
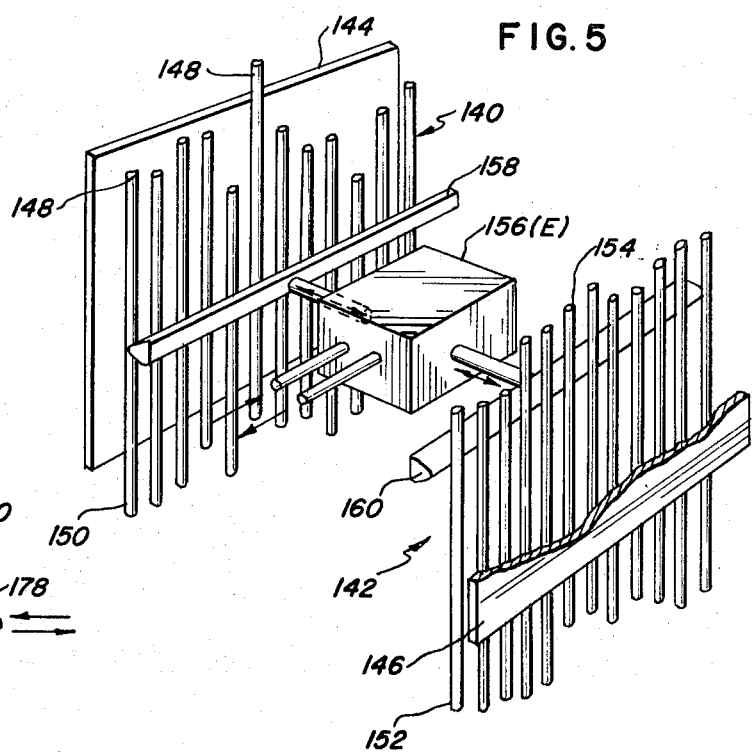
FIG. 5 is a perspective view illustrating the respective 12 input and output reagent lines to the reagent displacement dispensing pumps (one of which is shown in FIG. 4)

FIGS. 4, 5 and 6 in connection with FIG. 1 illustrate the components associated with the selective dispensing of additional reagents if desired at the dispensing stations 36, 38, 40 and 42.

In particular, FIG. 5 illustrates 12 input lines 140 and 12 output lines 142 mounted in contact with respective backing plates 144, 146. Each group of three input and output lines is associated with a respective set of reagent dispensers 50, 52, 54 and 56. With regard to the input lines 140, the respective inlet ends 148 are connected to a respective supply of reagent, while the outlet ends 150 are connected to a respective displacement pump, one of which is illustrated in FIG. 4.

With regard to the output lines 142, the inlet side 152 is connected to the output of a respective displacement pump, such as is shown in FIG. 4. The outlet end 154 extends to the respective reagent dispensing station, one of which is shown in FIG. 6, for dispensing a selected reagent to the reaction container 22 at the particular station. A double acting pneumatic cylinder 156 along with associated piston, and input and output air lines drives a first blocking bar 158 for blocking the input lines 140 and second blocking bar 160 for alternately blocking the output lines 142. It is to be understood that the input and output lines 140, 142 are formed of a flexible, resilient material so that as the blocking bars 158, 160 press the respective lines against plates 144, 146, the lines are blocked and liquid cannot pass therethrough. The input lines 140 are blocked when a reagent is being dispensed through output lines 142. Alternately, the output lines 142 are blocked when reagent is flowing in the input lines 140.

Referring now to FIG. 4, there is illustrated one of the displacement pumps 170 provided for each of the input lines 140 and output lines 142. Reagent inlet port 172 is provided for coupling the reagent from outlet end 150 of lines 140 for aspirating the reagent into pump chamber 174. An outlet port 176 communicates with the pump chamber 174 and is connected to the inlet side 152 of lines 142 for transmitting the reagent from chamber 174 to the particular reagent dispensing station. It is to be understood that 12 displacement pumps constructed such as pump 170 illustrated in FIG. 4 are included in the system, each associated with a pair of input lines 140 and output lines 142 for displacing a particular selected reagent to one of the reagent dispensing stations 36, 38, 40, and 42. It is further to be understood that the schematically illustrated reagent dispensers 50, 52, 54 and 56 in FIG. 1 each includes an associated reagent displacement pump 170 and the necessary input and output lines and blocking arrangement as shown in FIG. 5.

Each displacement pump 170 also includes an air inlet-outlet port 178 for compressed air to move the pump piston 180 against the action of a return spring (not shown) within the pump body of FIG. 4. This creates a suction on input port 172 to aspirate into chamber 174 a measured quantity of the selected reagent associated with the pump. Adjustable means 182 are provided for adjusting the length of stroke of piston 180 to precisely set the measured quantity of reagent drawn into chamber 174. Upon movement of the blocking valve 156 to place blocking bar 158 in fluid restrictive engagement against input lines 140, thereby unblocking the output lines 142, the selected solenoid-compressed air valve associated with pump 170 is operated to release the air pressure and enable the spring return to force the fluid reagent from chamber 174 through output port 176 and coupled output lines 142 to the particular reagent dispensing station.

After the reaction containers have been conveyed through all of the reagent dispensing stations and any additional reagents have been inserted therein, the reaction containers are conveyed to the measuring and recording apparatus 44. The measuring apparatus 44 can include a probe photometer illustrated in FIG. 8. As shown in FIG. 8, the reaction container 22 is sequentially conveyed by the chain conveyor 24 to the measuring apparatus 44, and in particular beneath an improved probe photometer 200 in accordance with another aspect of this invention. The improved photometer includes a photocell 202 mounted within a substantially open frame 204. Flexible light transmitting means such as a hollow light rod 206 is mounted within the frame 204 such that the transmitting end 208 is located immediately above and in direct radiating communication with the photocell 202. Another end 210 is located in receiving position immediately adjacent a light source 212. A filter 213 is suitably mounted intermediate the light source 212 and the end 210 for varying if desired the light emission from source 212 to the light rod 206. A cylinder 214 having a piston 216 connected to the frame 204 is provided for raising and lowering the frame so as to selectively insert the rod end 208 and photocell 202 within reaction container 22. Upon insertion of the frame 204 into reaction container 22, the light rod 206 receives light from source 212 for transmission via end 208 through a portion of the fluid intermediate end 208 and photocell 202. It is to be understood that the frame 204, as illustrated in FIG. 8, is substantially open, thereby allowing a portion of the fluid within reaction container 22 to be situated between photocell 202 and the end 208. Thus, the optical density or emission absorbence can be directly detected by the photocell 202.

Leads 218 interconnect photocell 202 with an amplifier 220 for recording the measured characteristics of the fluid in a recorder 222, such as a standard strip chart recorder. Digital print out means can of course also be provided if desired.

Referring now to FIG. 9, there is illustrated in schematic block diagram form the controls provided for sequentially controlling the operations of the various equipment herein described. Essentially two types of control means are utilized in the apparatus disclosed in FIGS. 1–8, that is, (1) pneumatic control, such as for the indexing arm of FIG. 2, the displacement pump of FIG. 4, the blocking valve of FIG. 5, and the probe photometer frame drive of FIG. 8; and (2) electrical actuation signals such as for the sample conveyor stepping motor 18, reaction container conveyor stepping motor 28, probe photometer light source 212, and reagent selector and associated light source 130. FIG. 9 schematically illustrates a series of separate solenoid-compressed air valves 230 provided for each of the required pneumatic controls illustrated. For convenience, the output of each of the particular valves 230 associated with the required control function is shown with reference alphabet characters. For instance, the output of solenoid-compressed air valve 230 connected to the indexing arm vertical pneumatic cylinder 60 is shown with an A, and for convenience the A is also shown in parentheses adjacent the numerical reference character 60 in FIG. 2. Also, the valve 230 shown in FIG. 9 with output B is schematically illustrated in FIG. 2 as connected to the horizontal pneumatic cylinder 34 by placing the B in parentheses adjacent the numeral 34. It is to be understood of course that in some instances, such as in connection with cylinder 34 one or more valves 230 may actually be connected to the particular cylinder in order to provide the operations herein described. The inclusion of one or more valves in the system to provide such functions is of course well within the skill of one in the art. Therefore, in order to avoid encumbering the drawings with similar apparatus, only one valve 230 is shown, although it is to be understood one or more valves may actually be involved.

Such solenoid-compressed air valves are well known devices which upon electrical actuation in response to an electrical signal, either provide a pressurized or depressurized condition to a respective air control line. Selective actuation of the required control valves is provided by preset sequential timing-program control means 232, including a sequential stepping clock device, counters, and gating circuits for providing the output control electrical signals at discrete timed intervals. Means are also provided in the control apparatus for predetermining the time during the sequential timing sequence when appropriate electrical signals will be coupled to the valve 230, the various stepping motors, probe light, etc. Such precise operating times for the various components can be preset into the timer-program 232 before running of the equipment so that the timer-program will be instructed to sequentially operate through the correct steps.

In addition to the required electrical signals for sequentially operating solenoid-compressed air valves 230, the timer also provides suitable electrical signals for operating the other equipment illustrated. For instance, there is preset into the timer-program suitable instructions for providing an electrical signal for sequentially stepping the sample conveyor motor 18 and the reaction container conveyor motor 28. In addition, a suitable electrical signal must be provided at the proper time for operating light source 212 in connection with the measuring apparatus 44. Such signals are schematically illustrated as G, H, and I in FIG. 9 with the associated apparatus responding thereto being similarly noted with such reference characters. In addition, the particular light source 130 which is to be energized for moving the associated reagent to the initial transfer position is derived from a suitable signal, J from the timer-program unit.

The particular components of a suitable timer-program unit are well known to those skilled in the art. In one version of a constructed embodiment of the present invention, the timer-program unit comprised a sequential stepping device providing 15 steps with each step occurring every two seconds for clocking all sequential operations; counters for counting the number of steps sequenced from the initial step position; and including well known gating circuits associated with and responding to the counters to provide the required output signals for operating the solenoid-valves 230 and the stepping motors, etc. The "program" in this embodiment of the system included switches and respective adjusting means to preset the counters to respond to a particular count from the stepping device so as to actuate or deactuate through associated gates the particular component associated with that counter. Such stepping devices or clocks, counters, gating circuits, and programs or means for presetting the sequence of operation, are well known by those skilled in the art of logic systems as used for controlling sequential operations, such as here. In particular, one may refer to "Pulse and Digital Circuits," J. Millman and H. Taub, 1956, particularly pages 323–354, chapter 11— "Counting."

As an example of the use of the present system, the sample containers 12 may contain discrete specimens of a body fluid, such as blood, urine, etc. Any of the various available laboratory or commercially prepared reagents can be utilized in the reagent containers 30 or can be supplied to the input lines 140 for displacement to any one or more of the reagent dispensing stations. The apparatus 10 is capable of providing either rate or colorimetric reaction analyses.

In a constructed embodiment of the invention, the apparatus is capable of measuring 120 serum or plasma samples per hour with the conveyor 14 capacity of 111 specimens.

In the initial setting up of the operation, the discrete samples are placed into the sample containers 12 and the timer-program unit is preset to provide the required sequence of operating functions in accordance with the particular samples to be measured. As an example, if there are 25 discrete blood specimens in containers 12, the timer-program is preset to sequentially step motor 18 to advance the respective samples adjacent the initial transfer position 20. The particular reagent to be dispensed at the initial transfer position corresponding to the light source 130 is also preset into the timer-program unit, and preset instructions are provided for stepping conveyor 24 to advance the reaction containers 22 past the initial transfer position in sequence with the sample containers 12. Both the sample conveyor 14 and the reaction container conveyor 24 will be sequentially stepped simultaneously, however, the sample conveyor 14 will stop after the 25th container has passed the initial transfer position, whereas the reaction container conveyor will continue. Thus, in effect, the counter associated with the sample conveyor 14 will count and sequentially provide an output to drive stepping motor 18 until all 25 sample containers have passed the initial transfer position 20. However, the reaction conveyor will continue to be operated by its associated counter and gating circuit so that the reaction containers can be traversed past the reagent dispensing stations and the measuring device and washing devices.

At reagent dispensing station 36, if in view of the incubation time corresponding to the travel time for the container from the initial transfer position to the dispensing station 36, it is then desired to add additional reagent, the counter-gate associated with the particular displacement pump 170 is preset for actuation at that time. Additional reagent may similarly be added at dispensing stations 38, 40 and 42. Thus, the reagent dispensing stations may be situated at 5 minute, 10 minute, 15 minute and 20 minute intervals from the initial transfer position 20, and if desired a particular reagent can be dispensed to the reaction container when it arrives at that station. When the first reaction container having a fluid sample therein reaches the measuring device 44, the preset counter-gate for operating pneumatic cylinder 214 and light source 212 is energized to insert the probe photometer 200 therein. The emission characteristics of the sample are then detected and recorded and the specimen is stepped around the closed loop to the container washer 46 and dryer 48. If desired disposable reaction containers can be utilized instead of the illustrated washer and dryer arrangement.

It can be seen that following the first 25 samples of blood, additional discrete specimens of urine, for instance, can be placed in the next sample containers 12. If required for the analysis of the new specimens, the timer-program unit can be preset to shut off one of the light beams 130 and turn on another, after the 25 blood samples have passed the initial transfer position 20, in order to move a different reagent to the initial transfer position for combining with the new urine specimens. In fact, the discrete specimens such as urine and blood can be intermixed in the sequence of sample containers 12 (i.e., blood-urine-blood-blood-urine), although the most convenient manner of operation is to arrange all of the same type of specimen in groups, that is, all urine specimens followed by all blood specimens, etc.

The foregoing detailed description has been given for clearness of understanding only, and no unnecessary limitations should be understood therefrom, as modifications will be obvious to those skilled in the art.

What is claimed is:

1. Apparatus for automatically preparing a plurality of discrete samples for chemical analysis utilizing any one or more of a number of reagents, said apparatus comprising:
    first conveying means for sequentially conveying a plurality of sample containers in a closed loop and initially respectively to a transfer position;
    selective reagent positioning means including reagent containers, for conveying and positioning a desired one of said reagents to said transfer position;
    second conveying means for sequentially conveying a plurality of reaction containers in a closed loop and initially respectively to said transfer position;
    an indexing arm assembly;
    a syringe mounted to said indexing arm assembly, said syringe having a piston member and including a probe end;
    vertical positioning means coupled to said indexing arm assembly for moving said assembly vertically;
    horizontal positioning means coupled to said syringe for moving said syringe horizontally and positioning said syringe probe end in selective alignment with respect to said reagent, sample, and reaction containers at said transfer position;
    pneumatic means directly connected to said piston member for moving said piston member in said syringes, said pneumatic means including a sample pneumatic cylinder, a reagent pneumatic cylinder and coupling means interconnecting said cylinders;
    sequential drive means coupled to said pneumatic means for selectively moving said piston member to aspirate reagent and sample into said syringe from said respective reagent and sample containers at said transfer position and to displace said sample and reagent into said reaction container at said transfer station;
    said sequential drive means including means connected to said sample pneumatic cylinder and said reagent pneumatic cylinder for sequentially operating said reagent pneumatic cylinder and said sample pneumatic cylinder to a aspirate first reagent and then sample into said syringe from said respective reagent and sample containers at said transfer station;
    a plurality of reagent dispensing stations positionally disposed adjacent and along said closed loop traversed by said reaction containers, said stations located at respective timed positions with respect to said transfer position, in accordance with the sequential conveying rate of said reaction containers around said loop; and
    reagent dispensing means at each of said stations for selectively dispensing reagent into a respective container at said station in accordance with the time duration of movement of said containers around said closed loop from said transfer position.

2. Apparatus for automatically preparing a plurality of discrete samples for chemical analyses utilizing any one or more of a number of reagents, said apparatus comprising:
    first conveying means for sequentially conveying a plurality of sample containers in a closed loop and initially respectively to a transfer position;
    selective reagent positioning means including reagent containers, for conveying and positioning a desired one of said reagents to said transfer position;
    said selective reagent positioning means including a platform for supporting a plurality of said reagent containers, a motor, gear means interconnecting said platform and motor, a photocell connected for movement with said platform, and a plurality of selective light means, including light beams, each corresponding to the positioning of one of said reagent containers on said platform at said transfer position, and including means interconnecting said photocell and said motor for operating said motor to place the desired reagent container at said transfer position in response to said photocell detecting one of said light beams;
    second conveying means for sequentially conveying a plurality of reaction containers in a closed loop and initially respectively to said transfer position;
    an indexing arm assembly;
    a syringe mounted to said indexing arm assembly, said syringe having a piston member and including a probe end;
    vertical positioning means coupled to said indexing arm assembly for moving said assembly vertically;
    horizontal positioning means coupled to said syringe for moving said syringe horizontally and positioning said syringe probe end in selective alignment with respect to said reagent, sample, and reaction containers at said transfer position;
    pneumatic means directly connected to said piston member for moving said piston member in said syringes;
    sequential drive means coupled to said pneumatic means for selectively moving said piston member to aspirate reagent and sample into said syringe from said respective reagent and sample containers at said transfer position and to displace said sample and reagent into said reaction container at said transfer station;
    a plurality of reagent dispensing stations positionally disposed adjacent and along said closed loop traversed by said reaction containers, said stations located at respective timed positions with respect to said transfer position, in accordance with the sequential conveying rate of said reaction containers around said loop; and
    reagent dispensing means at each of said stations for selectively dispensing reagent into a respective container at said station in accordance with the time duration of movement of said containers around said closed loop from said transfer position.

3. An apparatus for performing chemical analysis of a plurality of discrete samples utilizing any one or more of a number of reagents, including means for sequentially transporting said samples to a transfer position, means for obtaining measured quantities of said sample and reagent, and means for combining said measured quantities of sample and reagent, the improvement comprising:
    selective reagent positioning means for positioning a desired reagent to said transfer position, including;
    motor driven gear means coupled to said reagents;

photodetector means for selectively engaging said gear means to move the desired reagent to said transfer position, said photodetector means including a photocell mounted for simultaneous movement with said reagents;

a plurality of light sources each associated with a respective reagent at said transfer position; and selective means for energizing and deenergizing said respective light sources for positioning the desired reagent at said transfer position.

References Cited
UNITED STATES PATENTS

| | | | |
|---|---|---|---|
| 3,544,272 | 12/1970 | Vaills | 23—253 R |
| 3,526,480 | 9/1970 | Findl et al. | 23—253 R |

JOSEPH SCOVRONEK, Primary Examiner

U.S. Cl. X.R.

23—259; 250—218; 356—180, 201